(12) United States Patent
Vasilik

(10) Patent No.: US 7,809,725 B1
(45) Date of Patent: Oct. 5, 2010

(54) ACQUIRING WEB PAGE EXPERIMENT SCHEMA

(75) Inventor: Kenneth Eric Vasilik, Bellevue, WA (US)

(73) Assignee: Google Inc., Mountain View, CA (US)

( * ) Notice: Subject to any disclaimer, the term of this patent is extended or adjusted under 35 U.S.C. 154(b) by 321 days.

(21) Appl. No.: 11/874,843

(22) Filed: Oct. 18, 2007

(51) Int. Cl.
G06F 17/30 (2006.01)

(52) U.S. Cl. .................. 707/736; 707/755; 707/756; 715/208

(58) Field of Classification Search ............. 707/1–3, 707/102; 715/234–239
See application file for complete search history.

(56) References Cited

U.S. PATENT DOCUMENTS

| | | | |
|---|---|---|---|
| 6,605,120 B1 * | 8/2003 | Fields et al. ................. | 715/239 |
| 6,625,803 B1 | 9/2003 | Massena et al. | |
| 6,721,922 B1 | 4/2004 | Walters et al. | |
| 6,826,594 B1 | 11/2004 | Pettersen | |
| 6,920,609 B1 * | 7/2005 | Manber et al. .............. | 715/205 |
| 6,934,748 B1 | 8/2005 | Louviere et al. | |
| 7,028,001 B1 | 4/2006 | Muthuswamy et al. | |
| 7,031,932 B1 | 4/2006 | Lipsky et al. | |
| 7,039,599 B2 | 5/2006 | Merriman et al. | |
| 7,047,294 B2 | 5/2006 | Johnson et al. | |
| 7,168,040 B2 | 1/2007 | Yamamoto et al. | |
| 7,194,683 B2 * | 3/2007 | Hind et al. .................. | 715/235 |
| 7,523,087 B1 | 4/2009 | Agarwal et al. | |
| 7,594,189 B1 | 9/2009 | Walker et al. | |
| 2002/0042738 A1 | 4/2002 | Srinivasan et al. | |
| 2002/0069255 A1 | 6/2002 | Dinovo | |
| 2002/0129064 A1 | 9/2002 | Guthrie | |
| 2002/0143495 A1 | 10/2002 | Roser | |
| 2002/0188508 A1 | 12/2002 | Lee et al. | |
| 2003/0131106 A1 | 7/2003 | Kasriel | |
| 2004/0123247 A1 | 6/2004 | Wachen et al. | |
| 2004/0168122 A1 | 8/2004 | Kobipalayam | |
| 2005/0021397 A1 | 1/2005 | Cui et al. | |
| 2005/0034065 A1 * | 2/2005 | Weight ....................... | 715/513 |
| 2005/0071755 A1 | 3/2005 | Harrington et al. | |
| 2005/0071757 A1 | 3/2005 | Ehrich et al. | |
| 2005/0160002 A1 | 7/2005 | Roetter et al. | |
| 2006/0036400 A1 | 2/2006 | Kasriel et al. | |
| 2006/0271671 A1 | 11/2006 | Hansen | |
| 2007/0061700 A1 * | 3/2007 | Kothari et al. .............. | 715/505 |
| 2007/0100956 A1 | 5/2007 | Kumar | |
| 2007/0124671 A1 | 5/2007 | Hackworth et al. | |
| 2007/0130510 A1 | 6/2007 | Dharamshi et al. | |
| 2007/0136255 A1 | 6/2007 | Rizzo et al. | |
| 2007/0143672 A1 | 6/2007 | Lipton et al. | |

(Continued)

OTHER PUBLICATIONS

International Search Report and Written Opinion for International Application No. PCT/US2007/069496, mailed Feb. 2, 2009, 10 pages.

(Continued)

*Primary Examiner*—Debbie Le
(74) *Attorney, Agent, or Firm*—Fish & Richardson P.C.

(57) ABSTRACT

Methods, systems and apparatus, including computer program products, for acquiring an experiment schema from a test web page. The test web page is read and parsed to extract a web page experiment schema. The schema can be used by an experimentation system to request corresponding variable content for delivery to web page visitors.

17 Claims, 9 Drawing Sheets

U.S. PATENT DOCUMENTS

| | | | |
|---|---|---|---|
| 2007/0150353 | A1 | 6/2007 | Krassner et al. |
| 2007/0271352 | A1 | 11/2007 | Khopkar et al. |
| 2007/0271392 | A1 | 11/2007 | Khopkar et al. |
| 2007/0271501 | A1 | 11/2007 | Vasilik |
| 2007/0271511 | A1 | 11/2007 | Khopkar et al. |
| 2008/0028334 | A1* | 1/2008 | De Mes ............... 715/781 |
| 2008/0046415 | A1* | 2/2008 | Henkin et al. ............ 707/3 |
| 2009/0006192 | A1* | 1/2009 | Martinez et al. ......... 705/14 |
| 2009/0150253 | A1 | 6/2009 | Williams et al. |
| 2009/0204579 | A1* | 8/2009 | Govani et al. ........... 707/3 |

OTHER PUBLICATIONS

International Preliminary Report on Patentability for International Application No. PCT/US2007/069496, mailed Apr. 23, 2009, 8 pages.

Brain, "How Internet Cookies Work," [online] [retrieved on Apr. 26, 2000]; Retrieved from the Internet URL: http://computer.howstuffworks.com/cookie.htm, 2 pages.

"ProHTML ticker, Dynamic Drive," Archived Jan. 1, 2005, [online]; Retrieved from the Internet URL: http://www.dynamicdrive.com/dynamicindex2/prohtmlticker.htm, 2 pages.

Raggett et al., "HTML 4.01 Specification, W3C Recommendation," [online] [retrieved on Dec. 24, 1999]; Retrieved from the Internet URL: http://www.w3.org/TR/1999/REC-html401-19991224, 389 pages.

Snapshot from May 7, 2005, Kefta—Solutions—Customer Acquisition, "Customer Acquisition—drive more customers with greater efficiency", [online] Retrieved from the Internet URL: http://web.archive.org/web/20051029081141/www.kefta.com/optimization-solutions/customeracquisition.html, 3 pages.

Snapshot from Apr. 27, 2006, Kefta's Dynamic Targeting Solution, "It's about creating a meaningful and relevant experience for your visitors", [online] Retrieved from the Internet URL: http://web.archive.org/web/20060427125859/www.kefta.com/overview/approach.html, 2 pages.

Snapshot from Apr. 27, 2006, Kefta—Dynamic Targeting—the next generation of website personalization, "At Kefta, we believe in delivering the best message at the best time", [online]. Retrieved from the Internet URL: http://web.archive.org/web/20060427132429/www.kefta.com/overview/index.html, 2 pages.

Snapshot from Apr. 24, 2006, Offermatica: General A/B Test Demo, "What is Offermatica?", [online] Retrieved from the Internet URL: http://web.archive.org/web/20060422201155/www.offermatica.com/demos/ab.html, 7 pages.

Snapshot from Apr. 24, 2006, Offermatica: Hosted A/B testing, multivariate testing, and landing page optimization tools, "What is Offermatica?", [online]. Retrieved from the Internet URL: http://web.archive.org/web/20060422201114/www.offermatica.com/whatis-1.0.html, 2 pages.

Snapshot from Apr. 24, 2006, Offermatica: How it Works, [online]. Retrieved from the Internet URL: http://web.archive.org/web/20060428054148/www.offermatica.com/whatis-1.1.1.html, 1 page.

Snapshot from Apr. 28, 2006, Optimost: Improve conversion rates on any landing page, splash page, jump page, "Maximize Conversion Rates Increase Your Revenue", [online] Retrieved from the Internet URL: http://web.archive.org/web/20060425212837/www.optimost.com/, 1 page.

Snapshot from Apr. 23, 2006, Touch Clarity—Technology, "Control Groups", [online]. Retrieved from the Internet URL: http://web.archive.org/web/20060503215906/www.touchclarity.com/technology/detail.php?id=78, 1 page.

Snapshot from Apr. 23, 2006, Touch Clarity—Technology, "Targeting Engine", [online]. Retrieved from the Internet URL: http://web.archive.org/web/20060503215705/www.touchclarity.com/technology/detail.php?id=76, 1 page.

Snapshot from Apr. 23, 2006, Touch Clarity—Technology, "Implementation", [online]. Retrieved from the Internet URL: http://web.archive.org/web/20060503215833/www.touchclarity.com/technology/detail.php?id=80, 1 page.

Snapshot from Apr. 23, 2006, Touch Clarity—Technology, "Visitor Profiling", [online]. Retrieved from the Internet URL: http://web.archive.org/web/20060503215758/www.touchclarity.com/technology/detail.php?id=77, 1 page.

U.S. Appl. No. 11/874,852, filed Oct. 18, 2007, Running Multiple Web Page Experiments on a Test Page, Kenneth Eric Vasilik.

U.S. Appl. No. 12/610,242, filed Oct. 30, 2009, Web Pages with Conditional Content, Kenneth Eric Vasilik, Kobi Reiter.

U.S. Appl. No. 12/036,594, filed Feb. 25, 2008, Web Page Experiments With Fragmented Section Variations, Kenneth Eric Vasilik.

* cited by examiner

National Bicycle
Council Email
Newsletter

Please Provide us with the following information and after
confirmation, we'll start sending you our email newsletter Email*

First Name

Last Name

Zip Code

" * " indicates a mandatory field.

Interests (check all that apply):

☐ Safety/Community Awareness
☐ Healthy Lifestyle
☐ Leisure Rides
☐ Competition
☐ Mountain Biking
☐ Road Cycling Submit

Thank You for Registering!!

You will receive an email from us shortly.

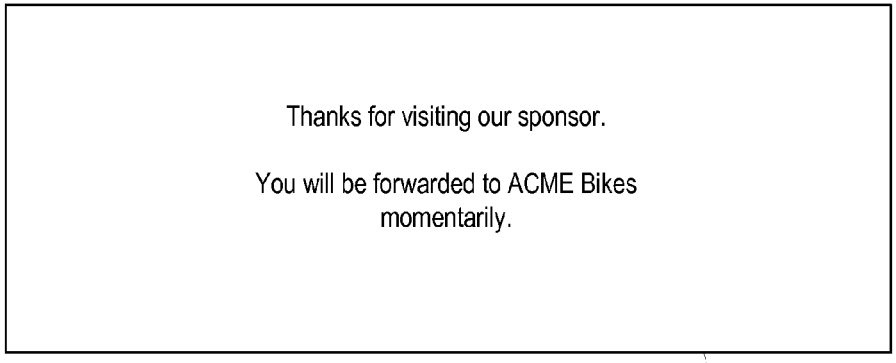

Thanks for visiting our sponsor.

You will be forwarded to ACME Bikes momentarily.

Place the following Control Script between the "<head>" and "</head>" tags of the test page:
www.nationalbicyclingcouncil.org/index.html <script><!-- Control Script ... //--></script>

Place the following Tracker Script between the <body> and </body> tags of the test page:
www.nationalbicyclingcouncil.org/index.html
and the conversion page:
www.nationalbicyclingcouncil.org/acmebikesforward.html <script><!-- Tracker Script ... //--></script>

Designate up to 8 variable sections in your test page:
www.nationalbicyclingcouncil.org/index.html
using the following format:

<script>utmx_section("NAME_OF_SECTION")</script>DEFAULT_VALUE</noscript>

```
<head>
<script><!-- Control Script ... //--></script>      702
...
</head>
...
<body>
...
<H1>
<script>utmx_section("Header")</script>Come Ride With Us!</noscript>      706
</H1>
...
<script>umtx_section("Image")</script><img src=racer.jpg></noscript>      708
...
<script>umtx_section("Text")</script>The National Bicycle Council is dedicated to promoting health,      710
knowledge, and safety to the benefit of bicycle enthusiasts nationwide.</noscript>
...
<script><!== Tracker Script ... //--></script>      704
</body>
```

```
...
<body>
...
<H1>Thanks for visiting our sponsor.<BR>
You will be forwarded to ACME <BR> Bikes momentarily
</H1>
...
<script><!== Tracker Script ... //--></script>      802
</body>
```

| Experiment_ID | Section Names |  |
|---|---|---|
| 123456 | Header, Image, Text | ... |

| Experiment_ID | Section Name |  |
|---|---|---|
| 123456 | Header | ... |
| 123456 | Image | ... |
| 123456 | Text | ... |

Your Experiments

Please select the experiment below that you wish to access:

| Name | Status |
|---|---|
| Experiment 1 | Running |
| Experiment 2 | Running |
| Experiment 3 | Pending |

Return to Account Home

| Experiment_ID | Section Name | Content |
|---|---|---|
| 123456 | Header | Get Your Bike On! |
| 123456 | Header | Safety on Two-Wheels |
| 123456 | Header | Stay in Shape and Have Fun! |
| 123456 | Image | <img src=kid.jpg> |
| 123456 | Image | <img src=sunset.jpg> |
| 123456 | Image | <img src=family.jpg> |
| 123456 | Text | The National Bicycle Coun... |
| 123456 | Text | Did you know that cycli... |
| 123456 | Text | Get off that couch, meet... |

ACQUIRING WEB PAGE EXPERIMENT SCHEMA

BACKGROUND

The present disclosure relates to testing variations in web page content.

Web pages available on modern websites, such as websites available on the Internet, are powerful communication tools for disseminating information regarding current events, organizations, and other items of interest to website visitors. Web pages can also provide targeted advertising of products and services. The content of web pages used to convey this information and deliver these advertisements varies considerably. Selections regarding style, graphics, and layout impact visitors' responses to the information offered on the web page, and seemingly small changes in web page appearance can sometimes dramatically change the effect of a web page on visitors.

The effectiveness of differing combinations of web page content can be gauged by measuring visitor responses to varying web page content. Through experimentation, effective website content can be identified.

SUMMARY

In general, one aspect of the subject matter described in this specification can be embodied in methods that include the actions of receiving a test web page, extracting an experiment identifier from the test web page, identifying a plurality of variable content sections in the test web page, extracting a respective section identifier for each of the plurality of variable content sections, storing the section identifiers in association with the experiment identifier, presenting a user interface screen requesting content for a variable content section corresponding to at least one of the section identifiers, receiving content for a variable content section corresponding to the at least one section identifier, and storing the received content in a record in association with the at least one section identifier. Other embodiments of this aspect include corresponding systems, apparatus, and computer program products.

These and other embodiments can optionally include one or more of the following features. Combinations of the content can be selectively delivered to a web browser accessing the test web page. User responses to the delivered combinations can be recorded, and a interface can be provided for accessing the recorded responses.

Particular embodiments of the subject matter described in this specification can be implemented so as to realize one or more of the following advantages. Manual input steps are reduced. Inconsistencies between variable content sections in code of a test page and manually entered information as well as a step of confirming that manually entered information matches code of a test page can be avoided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A illustrates an example data entry form web page.

FIG. 4B illustrates an example confirmation web page.

FIG. 5 illustrates an example sponsor forward web page.

FIG. 6 is an example message including instructions for placing variable content sections in a test page.

FIG. 7 is an example of HTML source of a test web page having installed scripts.

FIG. 8 is an example of HTML source of a conversion web page.

FIG. 10A shows an example record for storing captured experiment schema in a list.

FIG. 10B shows a set of example records for storing captured experiment schema.

FIG. 11 is an example user interface page of an experimentation system.

Like reference numbers and designations in the various drawings indicate like elements.

DETAILED DESCRIPTION

Figure 1:
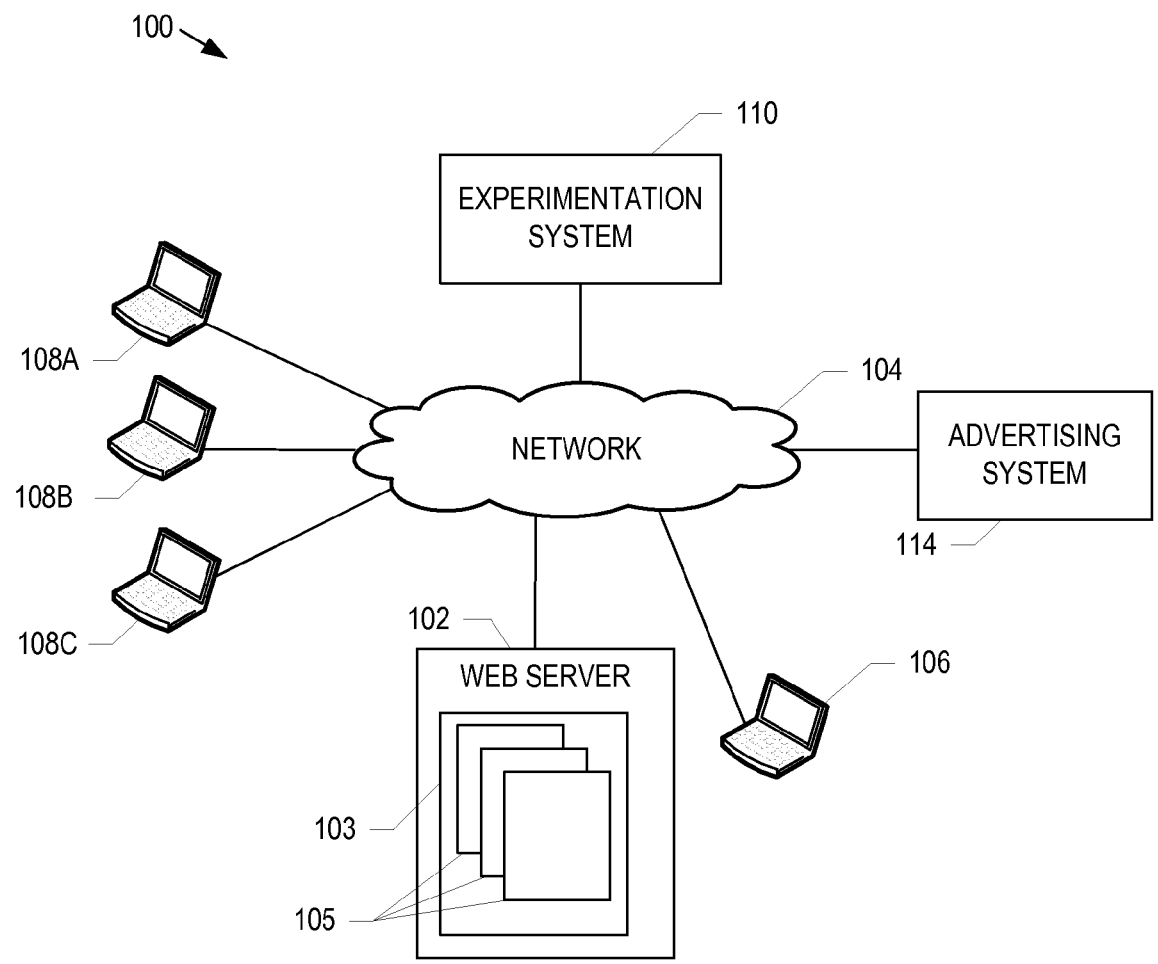
FIG. 1 is a block diagram of an example environment of an automated web page experimentation system.

FIG. 1 is a block diagram of an example environment 100 of an automated web page experimentation system 110. A web server 102 is connected to a network 104 such as the Internet. A website operator using a computer 106 can create, maintain, and otherwise administrate a website 103 having one or more web pages 105 stored on the web server 102. The web server can serve web page content 105 of the website 103 to visitors such as users of user computers 108A-108C through web browser software installed on the user computers 108A-C.

The web pages 105 include hypertext markup language (HTML) code that is interpreted by the web browsers to render the pages for display to a visitor, for example, on a display of the computer 108A. The web pages 105 can also include scripts. A script, in this context, refers to code embedded in a web page. Scripts can be written in, for example, Javascript.

Content of the web pages 105 of the website 103 can be directed toward one or more goals such as, for example, collecting names of visitors/customers, selling a product or service, directing traffic to more pages 105 of the website 103, and/or directing traffic to the website of a sponsor. Website operators, designers, and/or publishers (referred to collectively below as operators) generally select website content to achieve these goals. To optimize the content of one or more web pages 105 to reach a given goal, experimentation system 110 can be used to conduct a test that presents one or more web page variations to visitors and records the effectiveness of each variation in achieving the goal. A test that presents multiple variations in web page and/or website content is referred to herein as a multivariate test. The website operator can access the experimentation system 110 to create experiments, manage experiments, and view reports regarding the effectiveness of the variations.

In some implementations, the website operator utilizes an advertising system 114 to direct visitor traffic to the website 103. For example, the website operator can arrange to have advertisements, including hypertext links directing users to the website 103, placed on other Internet web pages. The pages selected for placement of the advertisements can, for example, be search engine results pages generated after a user enters a search string including one or more words selected by the website operator as relevant to the content of website 103. If the website 103 includes information regarding bicycling, for example, the website operator might arrange for advertisements to be placed on results pages for search queries including the word "cycling". In addition, advertisements can be placed by the advertising system on web pages operated by other website operators who agree to partner with the advertising system in delivering advertisements. The advertising system can then place advertisements for the website 103 on pages determined to have content that is contextually significant to the website 103. For example, an advertisement for the website 103 might appear on another bicycling related website. The website operator can agree to pay an owner of the advertising system a fee for each advertisement shown, and/or a fee for each time the advertisement successfully directs a visitor to the website 103.

The experimentation system can maintain records for a number of website operators. Each website operator can, for example, be given a user account. By logging into the experimentation system the website operator can view experiments that have been created by the website operator. For example, the website operator can create new experiments, start and stop experiments, and view experiment progress. The website operator can use the computer 106 to access a user interface of the experimentation system 110. The experimentation system 110 provides HTML code of user interface pages to web browser software of the computer 106. The computer 106 operates as a user interface device, and the HTML is interpreted by the web browser to render a user interface for display to the website operator. The experimentation system can generate an experiment identifier for a newly created experiment. An experiment identifier can be associated with a user account by, for example, storing the experiment identifier in a field of a database record that includes a user account identifier in another field.

Figure 2:
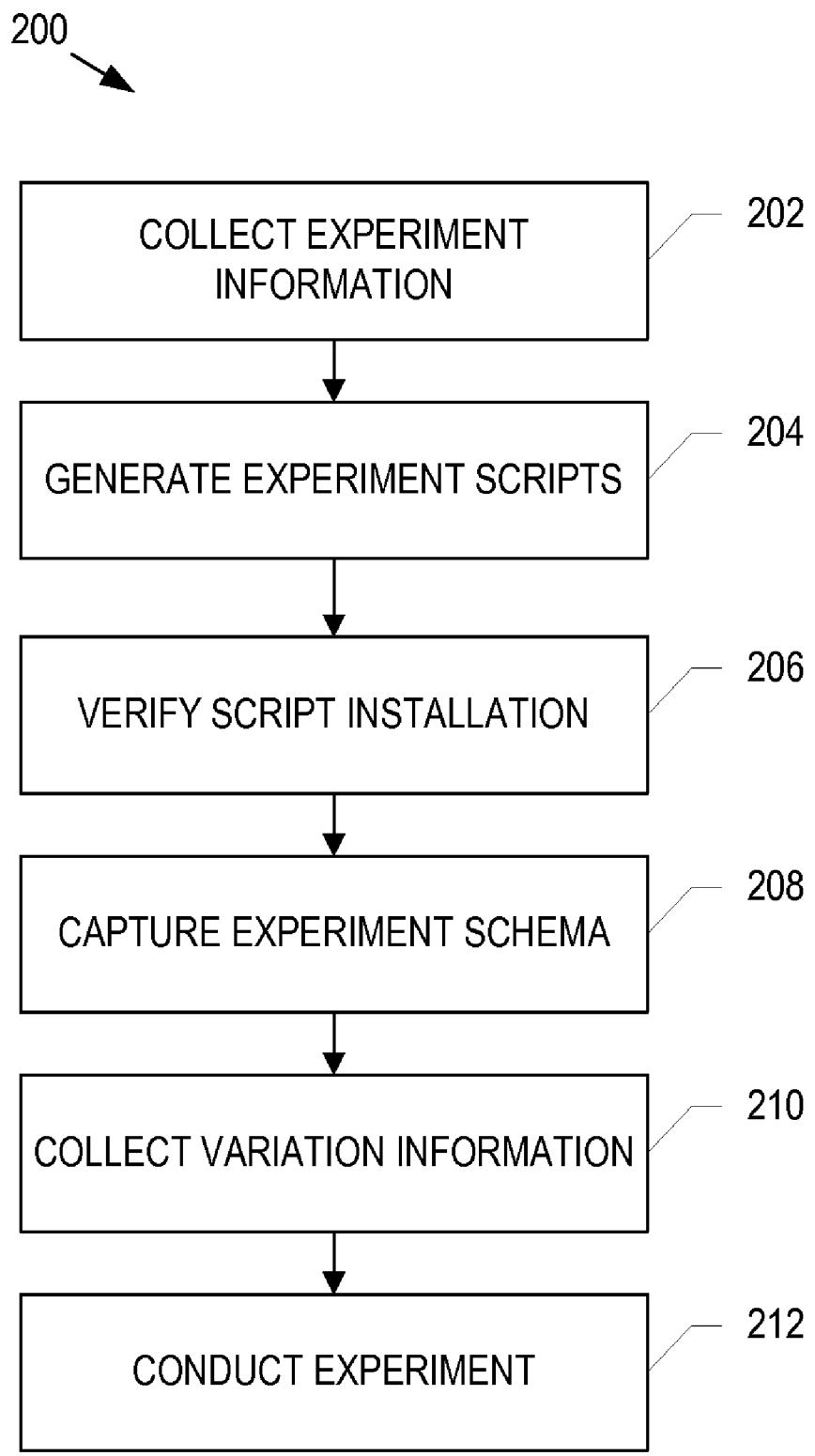
FIG. 2 is a flowchart of an example method of performing a web page experiment using an experimentation system.

FIG. 2 is a flowchart 200 of an example method of performing a web page experiment using an experimentation system 110. The website operator accesses a user interface (for example, a web based interface) of the experimentation system 110. The system collects experiment information (202). For example, the experimentation system can prompt the website operator to enter a name of a new experiment, a URL of a test page for the experiment, and a URL of a conversion page for the experiment. The test page is the page on which the experimentation system will conduct a multivariate test. The conversion page is a page designated by the website operator as a goal. A conversion occurs, and a given test page combination can be credited with the conversion, if a visitor reaches the conversion page after viewing the test page combination. The experiment information can be stored in the experimentation system 110 in a way that identifies it with the experiment identifier. For example the experiment information can be stored in a database record that includes the experiment identifier.

The experimentation system 110 generates one or more scripts for use on the test and/or conversion pages of the experiment (204). The experimentation system 110 can provide the scripts to the website operator through the user interface or in an email, for example. Instructions for installing the scripts on the test and conversion pages are also provided. The scripts can be installed, by inserting the scripts into the hypertext markup language of the test and/or conversion pages. The experimentation system additionally provides instructions for placing variable content sections in the test page.

Following the installation of the scripts, the website operator can indicate that the scripts have been installed using the user interface of the experimentation system 110. The experimentation system verifies that the scripts have been installed (206). The experimentation system reads the test page of the experiment to acquire the experiment schema (208). The experiment schema includes the name (or other identifier) and number of variable content sections to be varied on the test page by the experimentation system during the experiment. If variable content sections are found, the experimentation system captures information from these sections to use as the schema for the experiment. The schema is then used to prompt for and collect variation information for the experiment from the website operator (210). The variation information will be inserted into corresponding variable content sections by the experimentation system as explained below. The variation information is stored for use by the experimentation system. The experiment is then conducted (212). During the experiment, varying combinations of the test page are displayed to visitors, and the respective number of conversions for the combinations displayed are recorded by the experimentation system 110.

Figure 3:
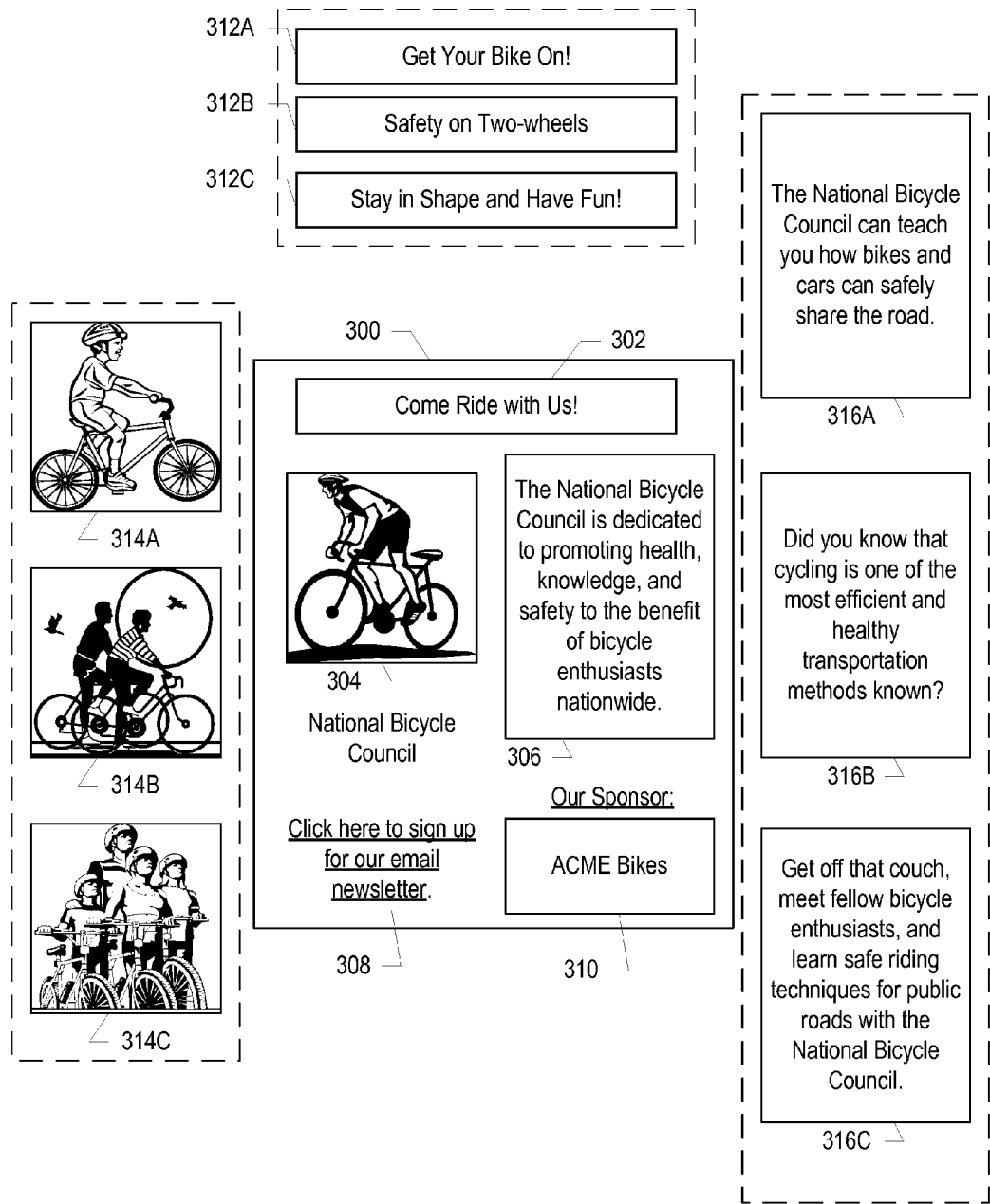
FIG. 3 is a diagram of an example test page and variations in content.

FIG. 3 is a diagram of an example test page 300 and variations in content. In some implementations, an advertisement of the advertising system 114 links to the test page 300. Test page 300 includes a heading 302, an image 304, text block 306, form link 308, and sponsor link 310. Content variations include heading variations 312A, 312B, and 312C, image variations 314A, 314B, and 314C, and text variations 316A, 316B, and 316C. The web page 300 has default content for the heading 302, image 304, and text block 306. The URL (for example "www.nationalbicyclingcouncil.org/index.html") of the test page 300 is provided to the experimentation system 110 through the user interface.

Through experimentation, the effectiveness of the default content and combinations of the content variations in achieving a goal can be measured. To measure the effectiveness, a goal is selected as the conversion page. The selected goal can be, for example, user visits to the newsletter signup page linked to by the link 308, actual data entered and submitted to that page, or user visits to the site sponsor linked to by link 310.

If the selected goal is a user visit to the newsletter sign up page, the conversion page can be a page having a newsletter signup form such as shown in FIG. 4A. FIG. 4A illustrates an example data entry form web page 400. If the selected goal is instead an actual submission of the newsletter signup form, the conversion page can be a confirmation page such as the page 402 shown in FIG. 4B. FIG. 4B illustrates an example confirmation web page 402.

If the selected goal is a user visit to a website sponsor, the confirmation page can be a page linked to by the sponsor link 310. FIG. 5 illustrates an example sponsor forward web page 500. The sponsor link 310 links to the forward page 500 which, after a short delay, redirects the user's browser to the sponsor website. The URL of the conversion page selected by the website operator as the goal (for example "www.nationalbicyclingcouncil.org/acmebikesforward.html") is provided to the experimentation system 110 through the user interface.

FIG. 6 is an example message 600 including instructions for placing variable content sections in a test page. The example message 600 includes a control script and a tracker script. Scripts can include, for example, an experiment identifier that uniquely identifies the experiment in the experimentation system 110. The control script can include code that when interpreted by a web browser causes the web browser to contact the experimentation system 110 to retrieve content for display by the browser in the variable content sections of the web page 300. The tracker script can include, for example, code for storing a cookie in memory of a computer on which a web browser is running (computer 108A, for example). The cookie can be used, for example, to determine whether a user has visited the test page within a certain period of time prior to visiting the conversion page as well as determining which combination of variable content was displayed to the user on the test page. For example, the cookie can include the experiment identifier of a test page accessed by the user, the time the test page was accessed, and/or indicators that denote which variable content was displayed to the user in respective variable content sections.

The example message 600 includes a format for variable content sections to be placed on the test page. The format shown in the example is: "<script>utmx_section ("NAME_OF_SECTION")</script>DEFAULT_VALUE</noscript>" where NAME_OF_SECTION is a name given to the variable content section by the website operator. DEFAULT_VALUE is the default page content for the given variable content section.

FIG. 7 is an example of HTML source 700 of a test web page having installed scripts. The HTML source includes a control script 702 and a tracker script 704. The HTML source also includes three variable content script sections 706, 708, and 710. The three variable content script sections correspond to the variable content sections of the example test page 300. The variable content script section 706 corresponds to the variable content section 302 of the test page 300. This section has been given the name "Header" by the website operator, and default content of "Come Ride With Us!". The variable content script section 708 corresponds to the variable content section 304 of the test page 300. This section has been given the name "Image" by the website operator, and default content of "<img src=racer.jpg>". The file "racer.jpg" is the image file of the image shown in section 304 of the test page 300. The variable content script section 710 corresponds to the variable content section 306 of the test page 300. This section has been given the name "Text" by the website operator, and default content matching the text shown in section 306 of the test page 300.

FIG. 8 is an example of HTML source 800 of a conversion web page. The HTML source 800 corresponds to the example page 500 of FIG. 5 and includes a tracker script 802 that has been installed by the website operator.

Once the scripts have been installed on the test page and conversion page, the website operator can initiate a script verification process. The operator can do this, for example, using the user interface of the experimentation system 110. The verification process can optionally check the HTML source of the web pages at the URL locations indicated for the experiment to determine if the scripts are installed correctly.

Figure 9:
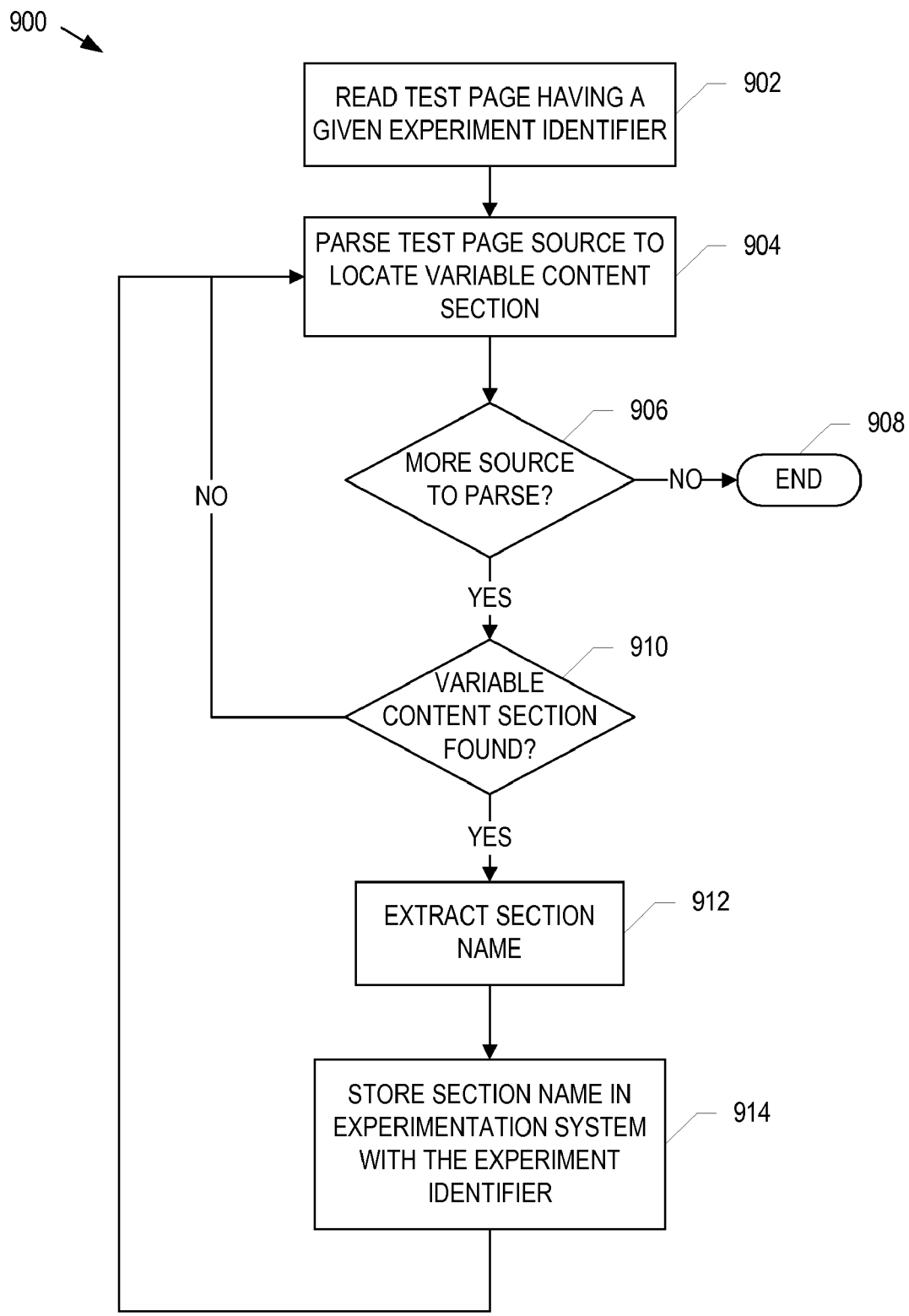
FIG. 9 is a flowchart of an example process for scanning a test web page to extract a test schema.

The experimentation system 110 reads the HTML source of the test page to scan for variable content scripts. FIG. 9 is a flowchart of an example process 900 for scanning a test web page to extract a test schema. The test page is read by the experimentation system 110 (902). The test page has a corresponding experiment identifier included in its source code. The experiment identifier can be located, for example, in one or more of the scripts installed on the test page. The experimentation system 110 begins parsing the HTML source of the test page to locate a variable content section (904). If there is no more source to parse (906) the process ends (908). The process loops to continue parsing the test page if a variable content section is not encountered (910). If a variable content section is found (910) the name of the variable content section is extracted (912) and the section name is stored in the experimentation system and associated with the experiment identifier (914).

For example, if the process 900 reads the example test page source code 700, the process reads the source code, and extracts section names "Header", "Image" and "Text" and stores these section names in the experimentation system 110 along with the experiment identifier corresponding to the experiment to be run on the test page.

By reading the HTML source of the test page, parsing the source, and extracting the variable content section names found on the test page, the experimentation system extracts a schema for the experiment for use with the experiment. The experimentation system 110 can request variable content from the website operator for use in the multivariate test to be conducted on the test page that is specific to the extracted schema. With the experiment schema known to the experimentation system, the website operator is not required to manually enter a schema for the test that matches the schema of the test page. Manual entry is repetitive in that the schema is entered by the website operator once on the test page, and error prone since the manual entry might not match the schema on the test page. Following a manual entry of web page schema an additional testing step may be needed to confirm that the manually entered schema matches the schema of the test page. Extraction of the test page schema by the experimentation system reduces the data entry burden on the website operator in conducting a multivariate test and reduces the possibility of errors.

FIG. 10A shows an example record 1000 for storing a captured experiment schema in a list. The record 1000 includes an experiment identifier field as well as a section names field. The section names field includes the captured experiment schema in a comma separated list. The record can include additional fields.

FIG. 10B shows a set of example records 1002 for storing a captured experiment schema. The captured experiment schema is stored in a plurality of records, each variable content section name being stored in a separate record. The records can include additional fields.

FIG. 11 is an example user interface page 1100 of an experimentation system 110.

The page 1100 can be displayed to a website operator upon logging into the experimentation system 110. The page 1100 shows a set of example experiments and their corresponding status. The page 1100 can be displayed, for example, in a web browser of the computer 108A. By selecting an experiment, through clicking on the experiment name, for example, a website operator can access the experiment to enter experiment information, start and stop the experiment, and/or see its progress.

Figures 12, 13:
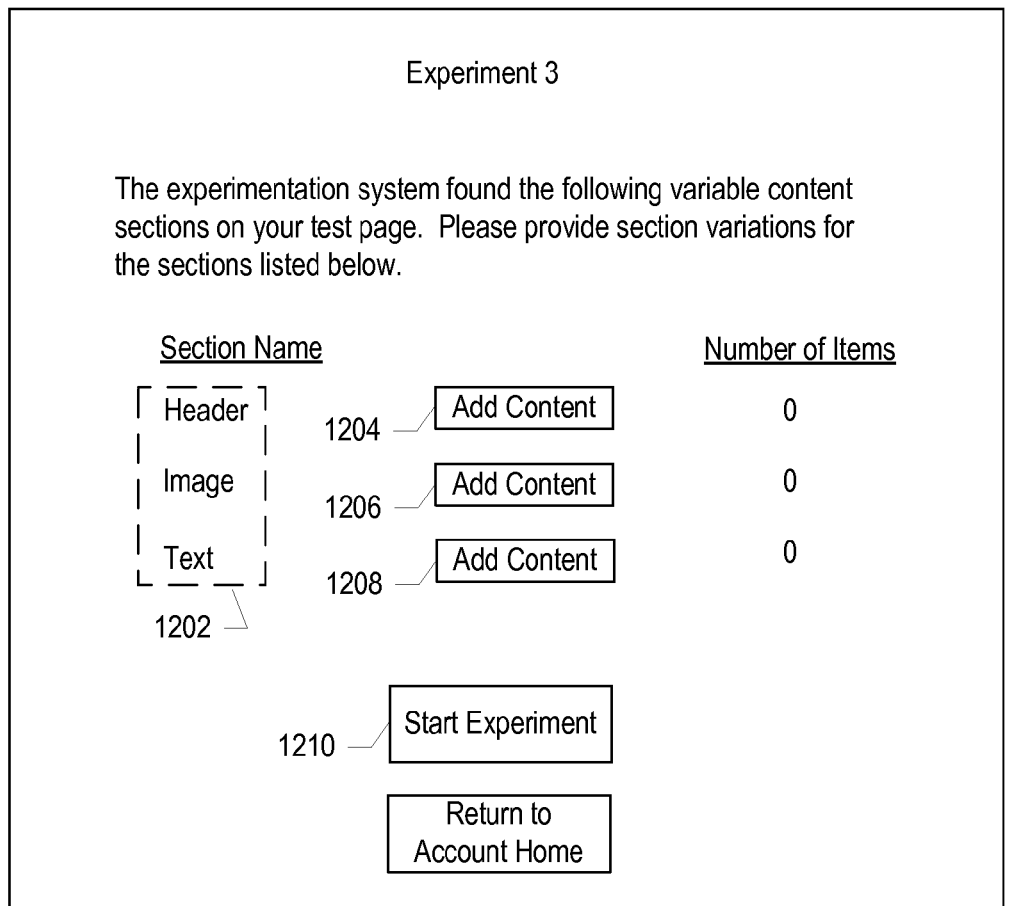
FIG. 12 is an example user interface experiment administration page.
FIG. 13 illustrates an example set of records for storing content variations.

FIG. 12 is an example user interface experiment administration page 1200. The page 1200 can be displayed, for example, in response to a user selecting an experiment of the web page 1100. The source HTML of the web page 1100 can include a link that references an experiment identifier. For "Experiment 3", which has a status of "pending", the link can refer to an experiment for which the experimentation system 110 has previously parsed the HTML source of the test page, which is found at the URL provided by the website operator. For example, the experiment identifier can refer to an experiment for which the experimentation system 110 has previously parsed the HTML source 700. The experiment administration page 1200 shows the section names 1202 that the experimentation system extracted from the HTML source of the test page. For instance, "Experiment 3" can correspond to an experiment identifier "123456". The experimentation system can query a database table for records associated with the experimentation identifier "123456" to retrieve a previously captured experiment schema and display the names of variable content sections on the page 1200. The experimentation system can also query a database table to find any variable content items associated with the variable content sections, count those items, and display the resulting number of content items next to the corresponding section name on the page 1200.

In response to a website operator clicking the "Add Content" button 1204, a dialog box for accepting content variation for the variable content section named "Header" can appear. The website operator can, for example, enter the variations in header content 312A-C of FIG. 3. In response to a website operator clicking the "Add Content" button 1206, a dialog box for accepting content variation for the variable content section named "Image" can appear. The website operator can, for example, enter the variations in image content 312A-C of FIG. 3. The dialog box can, for example, accept a file name of an image file located on the web server 102 or include a file selection and upload function so that the website operator can upload image files to the experimentation server. In response to a website operator clicking the "Add Content" button 1208, a dialog box for accepting content variation for the variable content section named "Text" can appear. The website operator can, for example, enter the variations in text content 312A-C of FIG. 3 by typing in the variations, pasting text into the forms, and/or uploading text files. The "Number of Items" column of web page 1200 can be updated by the experimentation system 110 to show the number of variable content items that have been added to the corresponding variable content section. The experiment can be started by selecting the "Start Experiment" button 1210.

FIG. 13 illustrates an example set of records 1300 for storing content variations. The content variations input to the system by a an operator though the interface page 1200 can be stored in the example records 1300. The records 1300 illustrate an example manner for storing the variable content of FIG. 3 in an experimentation system. The records include an experiment identifier field for denoting in which experiment the content in the content field is to be used, and a section name for denoting the variable content section into which the content is to be placed. The records having a section name of "Header" correspond to the header section 302 of FIG. 3. These records 1302 can store the content variations for the header section 302. The records having a section name of "Image" correspond to the image section 304 of FIG. 3. These records 1304 store the content variations for the image section 304. The records having a section name of "Text" correspond to the text section 306 of FIG. 3. These records 1306 can store the content variations for the text section 306.

While the experiment is running, on the test page 300, for example, the experimentation system, through communication with the web browser of a visitor's computer running the scripts installed on the test page 300, varies the test page displayed to visitors by selectively replacing the content in the variable content sections with one instance of the corresponding variable content entered by the website operator into the experimentation system. A number of resulting test page variations can be produced that include combinations of default variable section content (one instance of a variation for a given variable content section is using the default content) and content stored in the experimentation system. The experimentation system balances the number or instances of that a given combination is displayed to visitors such that each of the combinations are displayed an approximately equal number of times. Traffic to the page 300 is tracked by the experimentation system which records the number of times a given combination of variable content achieves the designated goal for the experiment. A user interface of the experimentation system can provide the data recorded by the experimentation system so that the relative conversion rates of the test page combinations can be compared.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer implemented method for acquiring a web page experiment schema at a web page experimentation system, comprising:
    receiving a test web page;
    extracting an experiment identifier from the test web page;
    identifying, using one or more processors, a plurality of variable content sections in the test web page;
    extracting a respective section identifier for each of the plurality of variable content sections, wherein a variable content section is a section that can include multiple variations in content;
    storing the section identifiers in association with the experiment identifier in computer memory;
    presenting a user interface screen requesting a user input that indicates content for a variable content section corresponding to at least one of the section identifiers;
    receiving the user input that indicates content for a variable content section corresponding to the at least one section identifier, wherein the content includes multiple variations of content to include in the variable content section; and
    storing the received content in computer memory in a record in association with the at least one section identifier.

2. The method of claim 1, further comprising:
    selectively delivering multiple combinations of the content to one or more web browsers accessing the test web page, wherein each combination includes a different variation of the content included in the variable content section.

3. The method of claim 2, further comprising:
    recording user responses to the delivered combinations of the test web page.

4. The method of claim 1, wherein the respective section identifier comprises a name of the variable content section.

5. The method of claim 1, further comprising:
    prior to receiving the test web page, sending a message including a format of a variable content section, wherein identifying a plurality of variable content sections in the test web page comprises parsing code to search for code sections that match the format.

6. A system for conducting web page experiments with experiment schema extracted from web pages, comprising:
    a user interface device; and
    one or more computers operable to interact with the user interface device and to:
    receive a test web page;
    extract an experiment identifier from the test web page;
    identify a plurality of variable content sections in the test web page;
    extract a respective section identifier for each of the plurality of variable content sections, wherein a variable content section is a section that can include multiple variations in content;
    store the section identifiers in association with the experiment identifier;
    present a user interface screen requesting a user input that indicates content for a variable content section corresponding to at least one of the section identifiers;
    receive the user input that indicates content for a variable content section corresponding to the at least one section identifier, wherein the content includes multiple variations of content to include in the variable content section; and store the received content in a record in association with the at least one section identifier.

7. The system of claim 6, wherein the one or more computers are further operable to:

selectively deliver multiple combinations of the content to one or more web browsers accessing the test web page, wherein each combination includes a different variation of the content included in the variable content section.

8. The system of claim 7, wherein the one or more computers are further operable to:

record user responses to a the delivered combinations of the content.

9. The system of claim 8, wherein the one or more computers are further operable to:

provide access to recorded responses to the user interface device.

10. The system of claim 6, wherein the respective section identifier comprises a name of the variable content section.

11. The system of claim 6, wherein the one or more computers are further operable to: prior to receiving the test web page, send a message including a format of a variable content section, wherein identifying a plurality of variable content sections in the test web page comprises parsing code to search for code sections that match the format.

12. A computer-readable medium encoded with instructions which, when executed by one or more computers, cause the one or more computers to perform operations comprising:

receiving the test web page;

extracting an experiment identifier from the test web page;

identifying a plurality of variable content sections in the test web page;

extracting a respective section identifier for each of the plurality of variable content sections, wherein a variable content section is a section that can include multiple variations in content;

storing the section identifiers in association with the experiment identifier;

presenting a user interface screen requesting a user input that indicates content for a variable content section corresponding to at least one of the section identifiers;

receiving content for a variable content section corresponding to the at least one section identifier, wherein the content includes multiple variations of content to include in the variable content section; and storing the received content in a record in association with the at least one section identifier.

13. The computer-readable medium of claim 12, wherein the operations further comprise:

delivering multiple combinations of the content to one or more web browsers accessing the test web page, wherein each combination includes a different variation of the content included in the variable content section.

14. The computer-readable medium of claim 13, wherein the operations further comprise:

recording user responses to delivered combinations.

15. The computer-readable medium of claim 14, wherein the operations further comprise:

providing access to recorded responses to the user interface means.

16. The computer-readable medium of claim 12, wherein the respective section identifier comprises a name of the variable content section.

17. The computer-readable medium of claim 12, wherein the operations further comprise:

prior to receiving the test web page, sending a message including a format of a variable content section, wherein identifying a plurality of variable content sections in the test web page comprises parsing code to search for code sections that match the format.

* * * * *